(12) United States Patent
Forster

(10) Patent No.: US 11,507,792 B2
(45) Date of Patent: Nov. 22, 2022

(54) APPARATUS AND METHOD OF INTERACTING MULTIPLE FORMS OF RFID TECHNOLOGY TO GIVE ADDITIONAL INFORMATION, SECURITY, AND PERFORMANCE

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/311,203

(22) PCT Filed: Dec. 18, 2018

(86) PCT No.: PCT/US2018/066334
§ 371 (c)(1),
(2) Date: Dec. 19, 2018

(87) PCT Pub. No.: WO2019/133347
PCT Pub. Date: Jul. 4, 2019

(65) Prior Publication Data
US 2021/0232883 A1 Jul. 29, 2021

Related U.S. Application Data

(60) Provisional application No. 62/611,397, filed on Dec. 28, 2017.

(51) Int. Cl.
*G06K 19/07* (2006.01)
(52) U.S. Cl.
CPC .............................. *G06K 19/0723* (2013.01)

(58) Field of Classification Search
CPC .................................................. G06K 19/0723
(Continued)

(56) References Cited

U.S. PATENT DOCUMENTS 8,914,061 B2 12/2014 Charrat et al.
2008/0309495 A1* 12/2008 Chisholm .......... G06K 7/10178
340/572.1

(Continued)

FOREIGN PATENT DOCUMENTS

| EP | 2535847 | 12/2012 |
|---|---|---|
| EP | 3076341 | 10/2016 |
| WO | 2004/015625 | 2/2004 |

OTHER PUBLICATIONS

International Preliminary Report on Patentability dated Jun. 30, 2020 issued In corresponding IA No. PCT/US2018/066334 filed Dec. 18, 2018.

(Continued)

*Primary Examiner* — Michael G Lee
*Assistant Examiner* — David Tardif

(57) ABSTRACT

An apparatus and method of combining more than one RFID technology to give operational benefits and new applications to RFID tags is disclosed. The RFID tags comprise UHF and/or HF tag functions which are either located in a single chip or located separately in two chips with a connection between the chips allowing the exchange of information. These RFID tags may then be used in a retail environment to assist in marketing, inventory control, and/or EAS operations.

16 Claims, 10 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2011/0273273 A1 | 11/2011 | Liu | |
| 2013/0110657 A1 | 5/2013 | Forster | |
| 2016/0033308 A1* | 2/2016 | Wiessflecker | H04W 4/70 |
| | | | 702/127 |
| 2016/0125285 A1* | 5/2016 | Nyalamadugu | H01Q 1/2225 |
| | | | 235/492 |
| 2016/0292556 A1* | 10/2016 | Kolman | G06K 19/0715 |
| 2016/0342821 A1* | 11/2016 | Nyalamadugu | G06K 7/10346 |

OTHER PUBLICATIONS

International Search Report and Written Opinion dated Mar. 26, 2019 issued in corresponding IA No. PCT/US2018/066334 filed Dec. 18, 2018.

* cited by examiner

APPARATUS AND METHOD OF INTERACTING MULTIPLE FORMS OF RFID TECHNOLOGY TO GIVE ADDITIONAL INFORMATION, SECURITY, AND PERFORMANCE

CROSS-REFERENCE TO RELATED APPLICATION(S)

The present application is a national stage entry of PCT/US2018/066334 filed Dec. 18, 2018, which claims priority to and the benefit of U.S. provisional utility patent application Ser. No. 62/611,397 filed Dec. 28, 2017, each of which is incorporated herein by reference in its entirety.

BACKGROUND

The present invention relates generally to an apparatus and method of combining more than one radio-frequency identification ("RFID") technology to give operational benefits and new applications to RFID tags. Specifically, the RFID tags comprise ultra-high frequency ("UHF") and/or high frequency ("HF") tag functions which are either located in a single chip or located separately in two chips with a connection between the chips allowing the exchange of information. These RFID tags may then be used in a retail environment to assist in marketing, inventory control, and/or electronic article surveillance ("EAS") operations.

Although other RFID technologies can also be used, the disclosure focuses on HF (operating at 13.56 MHz) and UHF technology (operating at various bands worldwide including 865-868 MHz in Europe and 902-928 MHz in the United States). Accordingly, the present specification makes specific reference thereto. However, it is to be appreciated that aspects of the present inventive subject matter are also equally amenable to other like applications.

RFID is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer database.

Currently, the only RFID technology implemented in mobile phones is a reader of HF, 13.56 MHz band tags in close proximity. However, retailers and other business sectors, such as healthcare, are deploying UHF technology for inventory control and EAS functions, as it is cheaper and has much longer transmission ranges. Thus, devices allowing these two technologies to be bridged or combined is needed.

The present invention discloses an apparatus and method of combining more than one RFID technology to give operational benefits and new applications to RFID tags. The RFID tags comprise UHF and/or HF tag functions, which are either located in a single chip or located separately in two chips with a connection between the chips allowing the exchange of information. These RFID tags may then be used in a retail environment to assist in marketing, inventory control, and/or EAS operations.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a dual mode RFID tag attached to a mobile phone, wherein the RFID tag comprises a near-field communications ("NFC") booster that uses NFC and UHF tag functions with a shared memory block. The RFID tag is capable of communicating with an NFC transceiver in the mobile phone and the UHF tag is capable of communicating at a relatively long range with an UHF reader system, which may be attached to the mobile phone.

In another embodiment, a dual mode RFID tag is attached to a product or to a structure holding the product. A consumer can then read the NFC portion of the RFID tag with a mobile phone or other NFC equipped mobile device to allow access to a website or further product information. The NFC function can also interact with the UHF system via the shared memory.

Additionally, dual mode technology can be applied to the RFID tags, wherein they comprise both an HF field emitter and a UHF reader. Thus, the presence of the HF field may provide energy to increase the range of the UHF tag, or it can just set a flag in its shared memory indicating that the field is present.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
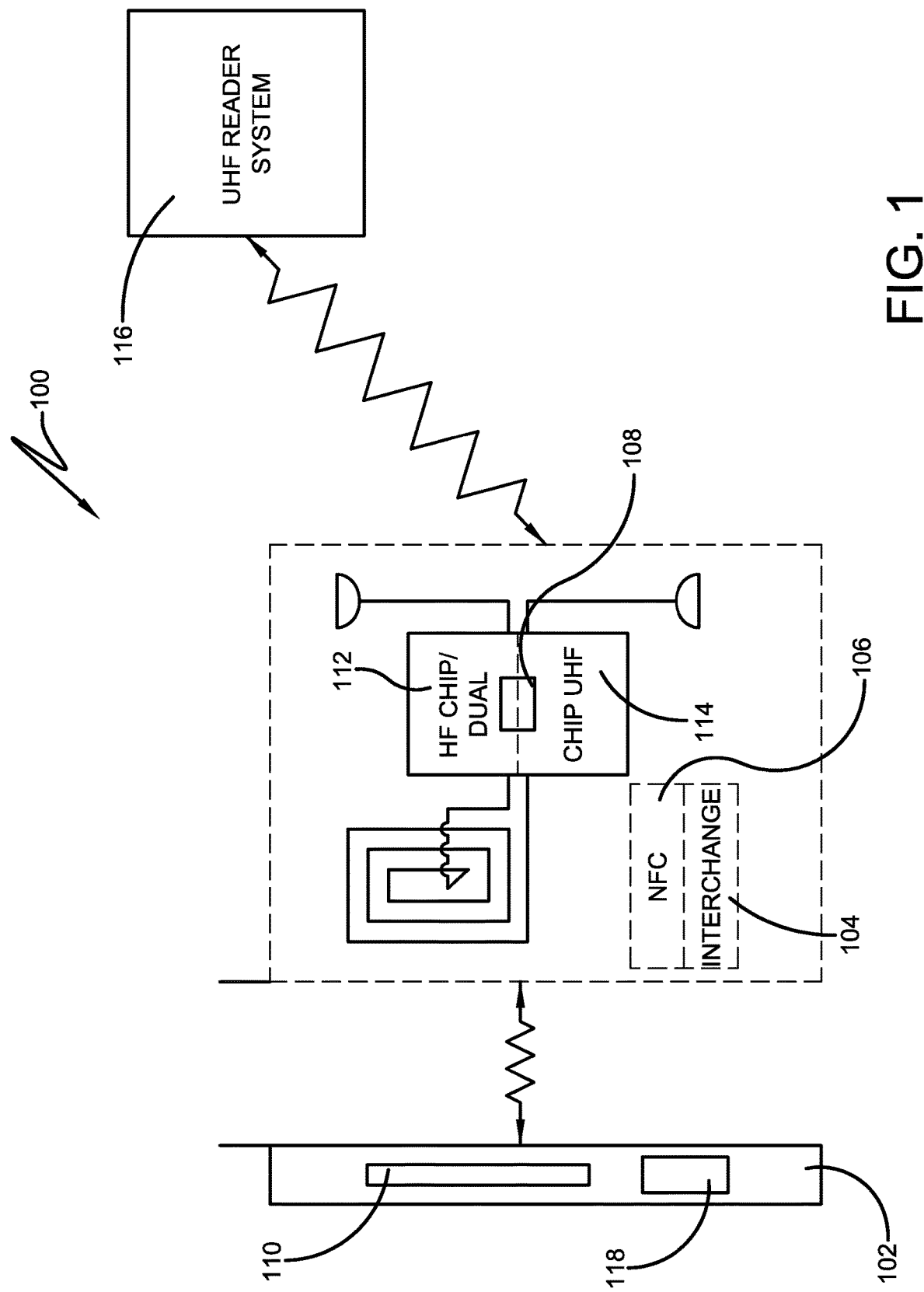
FIG. 1 illustrates a top perspective view of a RFID tag attached to a mobile phone and having a NFC booster using NFC and UHF tag functions with a shared memory block in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a method of combining more than one RFID technology to give operational benefits and new applications to RFID tags. The RFID tags comprise UHF and/or HF tag functions which are either located in a single chip or located separately in two chips with a connection between the chips allowing the exchange of information. These RFID tags may then be used in a retail environment to assist in marketing, inventory control, and/or EAS operations.

Referring initially to the drawings, FIG. 1 illustrates a RFID tag 100 attached to a mobile phone 102 or other suitable NFC device as is known in the art. The RFID tag 100 is typically a dual mode tag, but could also be a single mode tag connected to another single mode tag. The RFID tag 100 comprises a NFC booster 106 which utilizes NFC and UHF tag functions and communications and a shared memory block component 108. Specifically, the RFID tag 100 is capable of communicating with an NFC transceiver 110 in a mobile phone 102 or other suitable device as is known in the art, and the RFID tag 100 comprises a HF core component 112 and a UHF core component 114 capable of communicating at a relatively long range with a UHF reader system 116. The RFID tag 100 is attached directly to a mobile device 102 or other suitable NFC device as is known in the art, incorporated into a mobile phone case, or attached to an item (e.g., an article of clothing) to which the mobile phone 102 is stored in proximity to. Typically, the RFID tag 100 can be any suitable size, shape, and configuration as is known in the art without affecting the overall concept of the invention. One of ordinary skill in the art will appreciate that the shape and size of the RFID tag 100 as shown in FIG. 1 is for illustrative purposes only, and many other shapes and sizes of the RFID tag 100 are well within the scope of the present disclosure. Although dimensions of the RFID tag 100 (i.e., length, width, and height) are important design parameters for good performance, the RFID tag 100 may be any shape or size that ensures optimal performance during use.

The mobile phone 102 is capable of communicating with the RFID tag 100 via its NFC interface 104 which, if required, can use secure communications involving cryptography and/or other suitable securing means as are known in the art. Further, a limited and protected area of the memory 118 of the NFC device (mobile device 102) is also available to the UHF core component 114. In this manner, the UHF technology of the UHF reader system 116 can interact with the user's mobile phone 102 (or other NFC device) via its NFC interface 104, in a secure and controlled way.

Additionally, the mobile device 102 (or other NFC device), via its NFC interface 104, supplies relatively significant energy to the NFC booster 106 of the RFID tag 100. This energy, when rectified, is sufficient to operate the UHF core component 114 of the RFID tag 100 in an extended range mode, typically described as 'semi passive' or 'battery assisted passive', although in this case no battery is actually connected to the RFID tag 100. When the RFID tag 100 is operated in this assisted mode, the UHF core component 114 of the RFID tag 100 can operate at a greatly extended range.

In a preferred embodiment, the UHF core component 114 of the RFID tag 100 reverts to passive mode when energy from the NFC transceiver 110 of the NFC device (mobile device 102) is not available, for example when the mobile device 102 is in stand-by mode. However, passive mode still allows the shared memory block component 108 to be written to and read from. Accordingly, the data written to and from the UHF core component 114 of the RFID tag 100 by the mobile device 102 could include, by way of example and without limitation, a random number providing a short-term ability to locate and track the mobile device 102 using the UHF reader system 116 (and its technology). Applications for this function could be, for example, to allow the system to feedback via WiFi or other wireless means, the current location of the mobile device 102, thus assisting with indoor navigation.

The data written to and from the UHF core component 114 could also be a customer number or user identification (ID). In this manner, for example and without limitation, a store system could navigate a customer to a particular product in the store and provide, in response to the ID, a coupon, discount, information and/or passcode to allow the customer to access the store WiFi without having to come into the proximity associated with the same function via NFC. Further, the data can include an authorization to take some amount of money when the mobile phone is co-located in an area, such as an executive lounge at an airport, based on the time spent, or as rental for a piece of equipment such as a bike. Additionally, the system can write into the UHF tag such things as special offers and tokens, without the user having to allow their mobile phone to log onto unknown WiFi networks that may host malicious activity or otherwise be unsecure.

Data related to the local inventory of products as determined by the UHF reader can also be provided. For example, the data packet in the shared memory can be a request to find a specific product in a specific size, color, texture, etc. The UHF reader in the store system, which comprises the live inventory of the area, or can also perform an 'on-demand' scan of the area, will locate the product the customer is looking for and send data to the shared memory relating to its location, or, if not found, offer to ask an assistant to bring the item to the customer.

Figure 2:
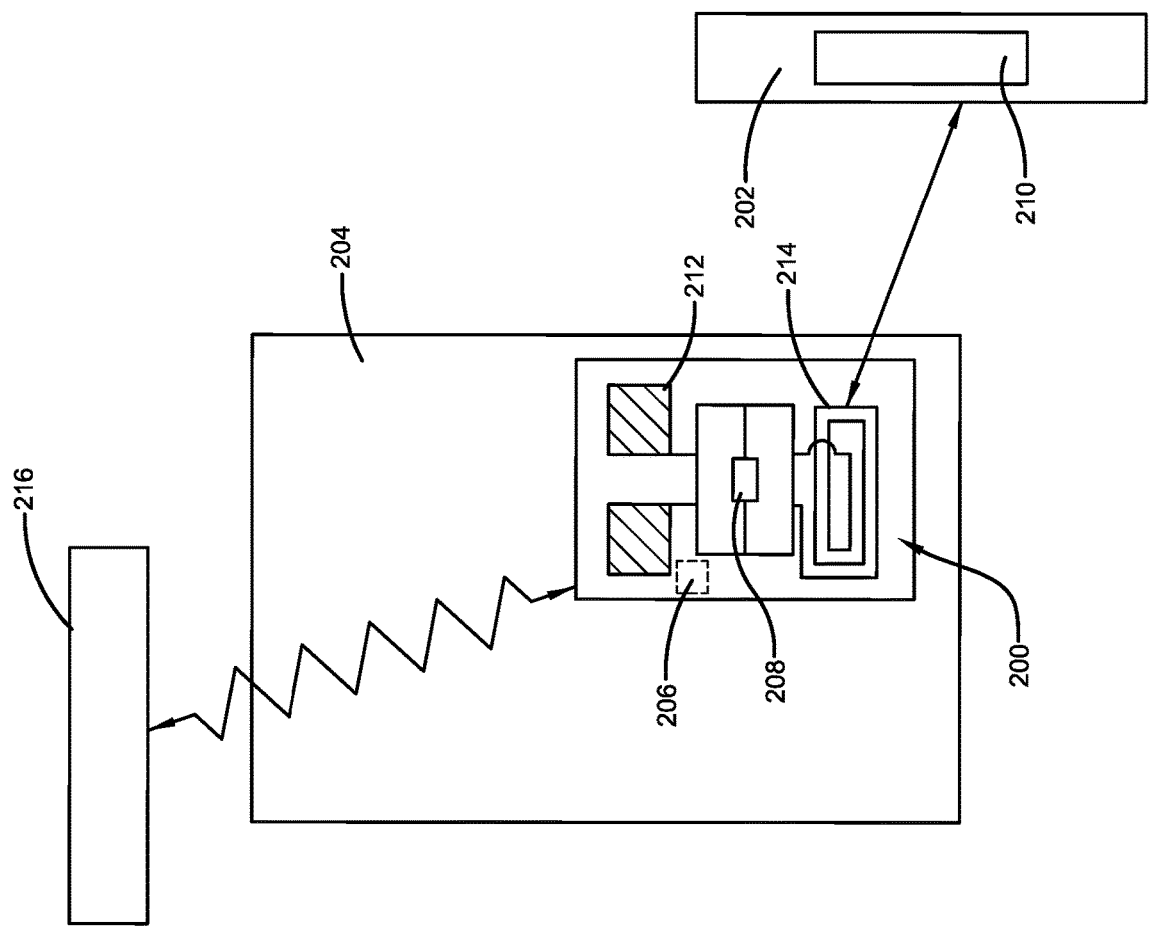
FIG. 2 illustrates a top perspective view of a RFID tag attached to an item or a display and having NFC and UHF tag functions with shared memory block in accordance with the disclosed architecture.

In another embodiment as shown in FIG. 2, a RFID tag 200 is attached to a boxed or hanging item 204, or display stand or shelf, or any other suitable area as is known in the art. The RFID tag 200 is typically a dual mode tag, but could also be a single mode tag connected to or in communication with another single mode tag. The RFID tag 200 utilizes NFC and UHF tag communication functions with a shared memory block component 208. Specifically, the dual mode RFID tag 200, which comprises an HF core component 212 and an UHF core component 214, is attached to a product 204 or the structure holding the product. A user may then read the NFC interface component 206 of the RFID tag 200 with a mobile phone 202 or other NFC equipped mobile device via the NFC transceiver 210 to allow access to a website or further product information. However, the NFC communications function can also interact with the UHF communications system via the shared memory block component 208. Further, the shared memory block component 208 may comprise a single bit or flag, or an implicit memory 'bit' when the NFC interface component 206 provides energy to the UHF core component 214 of the RFID tag 200. Thus, a UHF reader system 216 integrated into a store's infrastructure, either in the form of a 'smart shelf' or an overhead phased array reader system, can determine when the NFC function of RFID tag 200 is being interrogated. This information can then be used to monitor the effectiveness of the operation.

Additionally, if the mobile phone 202 shares a 'token' or other identifying item as is known in the art into the shared memory block component 208, other functionality is possible. For example, if mobile phone 202 were to use a random number generated on each store visit, the store system could determine what products the particular user interacted with without gathering information that would present a privacy concern to the customer. Further, via the UHF reader system 216, a store generated code could be written into the shared memory block component 208 which, via the NFC interface 206, could offer that particular user/customer a discount on a linked purchase when presented at the checkout. Further, if the mobile phone 202 were to share a token associated with a loyalty program, a targeted offer or discount can also be offered to the customer via the UHF core component 214 as a datalink into the NFC interface 206, without the customer having to access the store's WiFi network.

As stated supra, the NFC energy harvested from a user's mobile device 202 can perform the following functions: activating some form of visual or audible output from the product being read to increase its appeal while accessing information. The NFC energy can also allow for charging a capacitor or other energy storage device such that the UHF core component 214 is able to maintain its status in a high sensitivity state for an extended period of time, making inventory of that product easier and making it easier to track the product if an attempt is made to steal the product.

Further, the dual mode RFID tag 200 incorporating an NFC communication capability and UHF RFID communication capability can be implemented in multiple ways including, without limitation: (i) utilizing a single mode RFID chip with two communication interfaces; (ii) utilizing a dual mode single communication interface coupled to either two co-located antennas, one antenna operating at HF and the other antenna operating at UHF, or a suitable dual mode antenna; or (iii) utilizing two RFID chips with a communication interface between the RFID chips which allows for the sharing of data and power as disclosed above, with one of the antenna structures described above.

Multiple structures showing the configurations of dual and single RFID chip approaches with different structures for the shared memory block component are shown in FIGS. 3A-E. For example, FIG. 3A discloses a dual mode RFID chip 300 comprising a UHF core chip component 302 and an HF core chip component 304 with a separate shared memory block component 306 connected to both the UHF 302 and the HF 304 chip components. The HF core chip component 304 further comprises an HF coil antenna 306 and the UHF core chip component 302 comprises a UHF antenna 308.

Figure 3A:
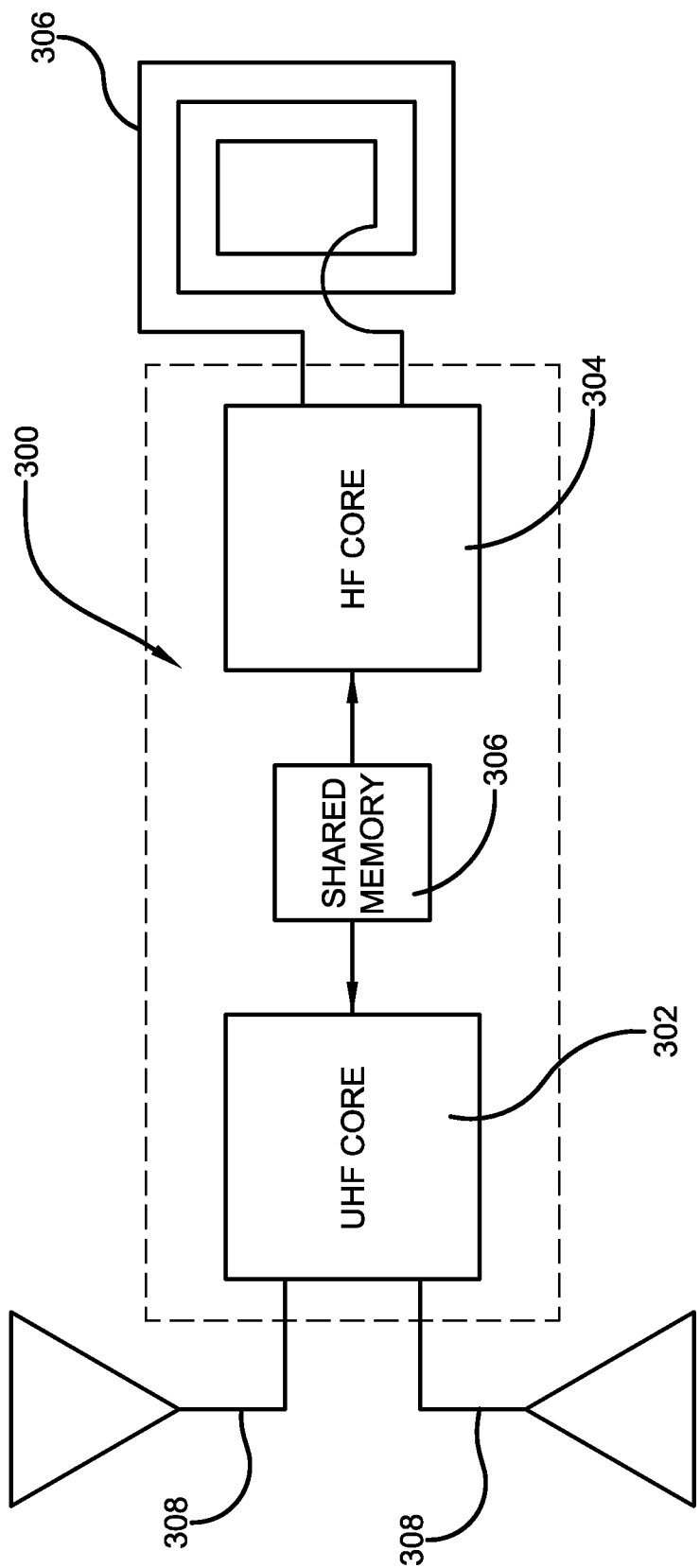
FIG. 3A illustrates a top perspective view of a dual mode tag comprising both UHF and HF chips and a shared memory component connected to both chips in accordance with the disclosed architecture.
Figure 3B:
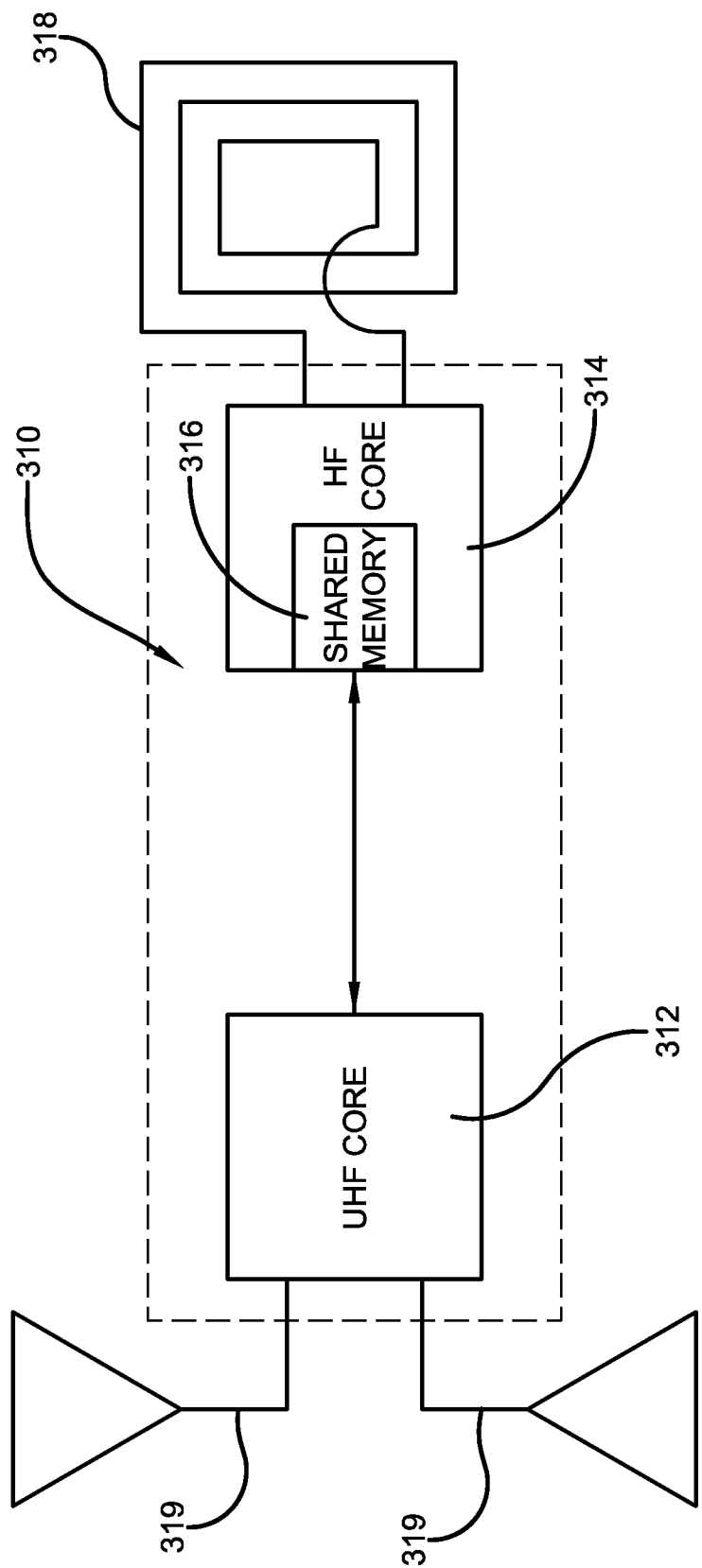
FIG. 3B illustrates a top perspective view of a dual mode tag comprising both UHF and HF chips and a shared memory component positioned in the HF chip segment in accordance with the disclosed architecture.

FIG. 3B discloses a dual mode RFID chip 310 comprising a UHF core chip component 312 and an HF core chip component 314 with a shared memory block component 316 located in the HF core chip component 314. The HF chip component 314 further comprises an HF coil antenna 318 and the UHF core chip component 312 comprises a UHF antenna 319.

Figure 3C:
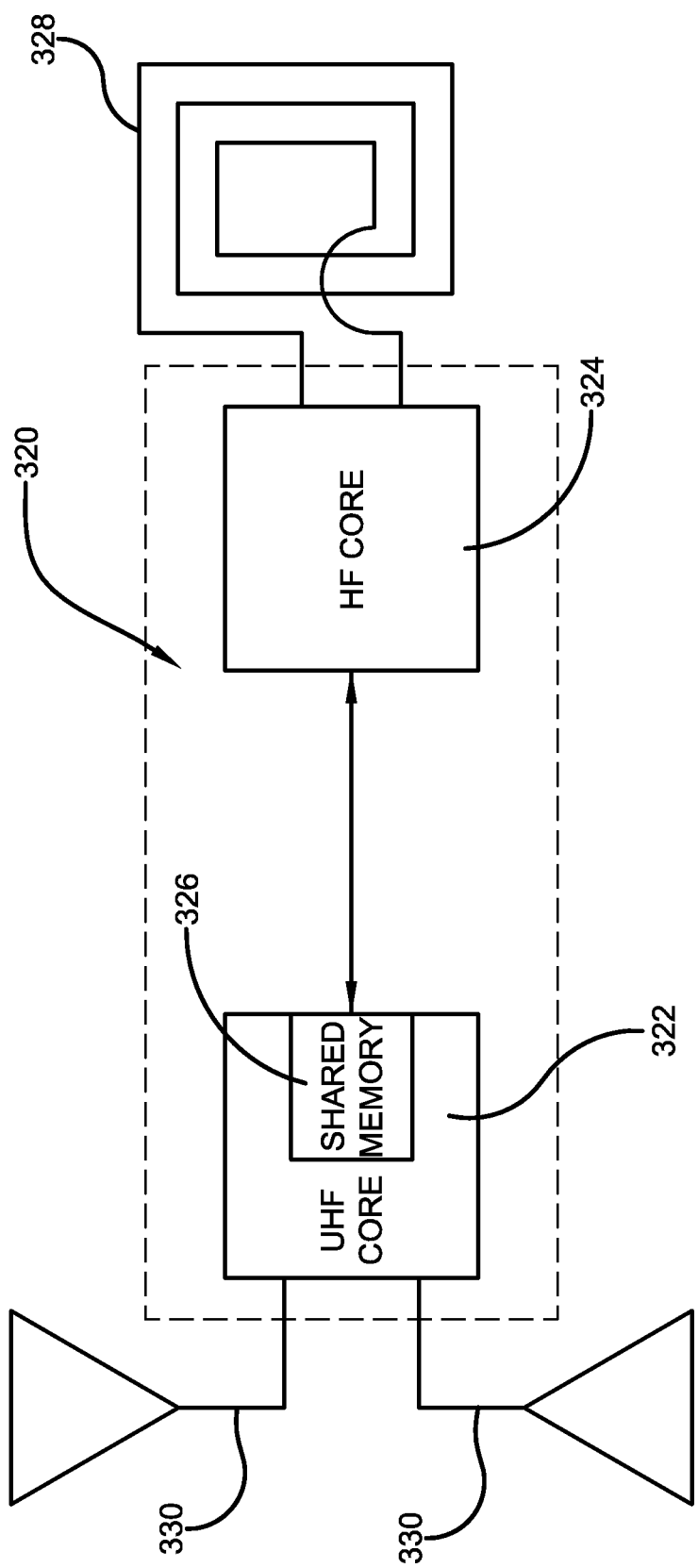
FIG. 3C illustrates a top perspective view of a dual mode tag comprising both UHF and HF chips and a shared memory component positioned in the UHF chip segment in accordance with the disclosed architecture.

FIG. 3C discloses a dual mode RFID chip 320 comprising a UHF core chip component 322 and an HF core chip component 324 with a shared memory block component 326 located in the UHF core chip component 322. The HF core chip component 324 further comprises an HF coil antenna 328 and the UHF core chip component 322 comprises a UHF antenna 330.

Figure 3D:
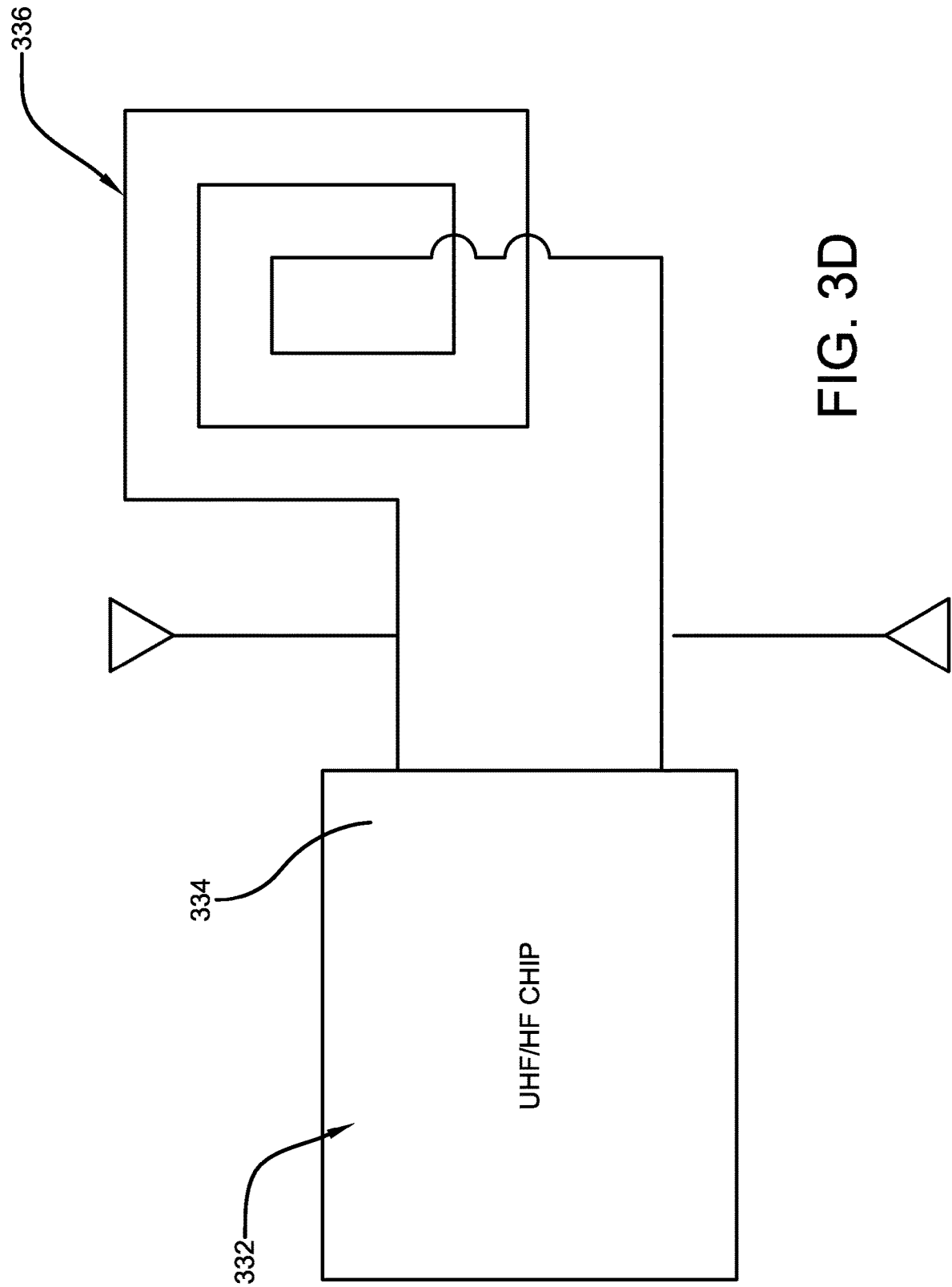
FIG. 3D illustrates a top perspective view of a single mode tag comprising common interface for connection of either combined or separate UHF and HF antennas in accordance with the disclosed architecture.
Figure 3E:
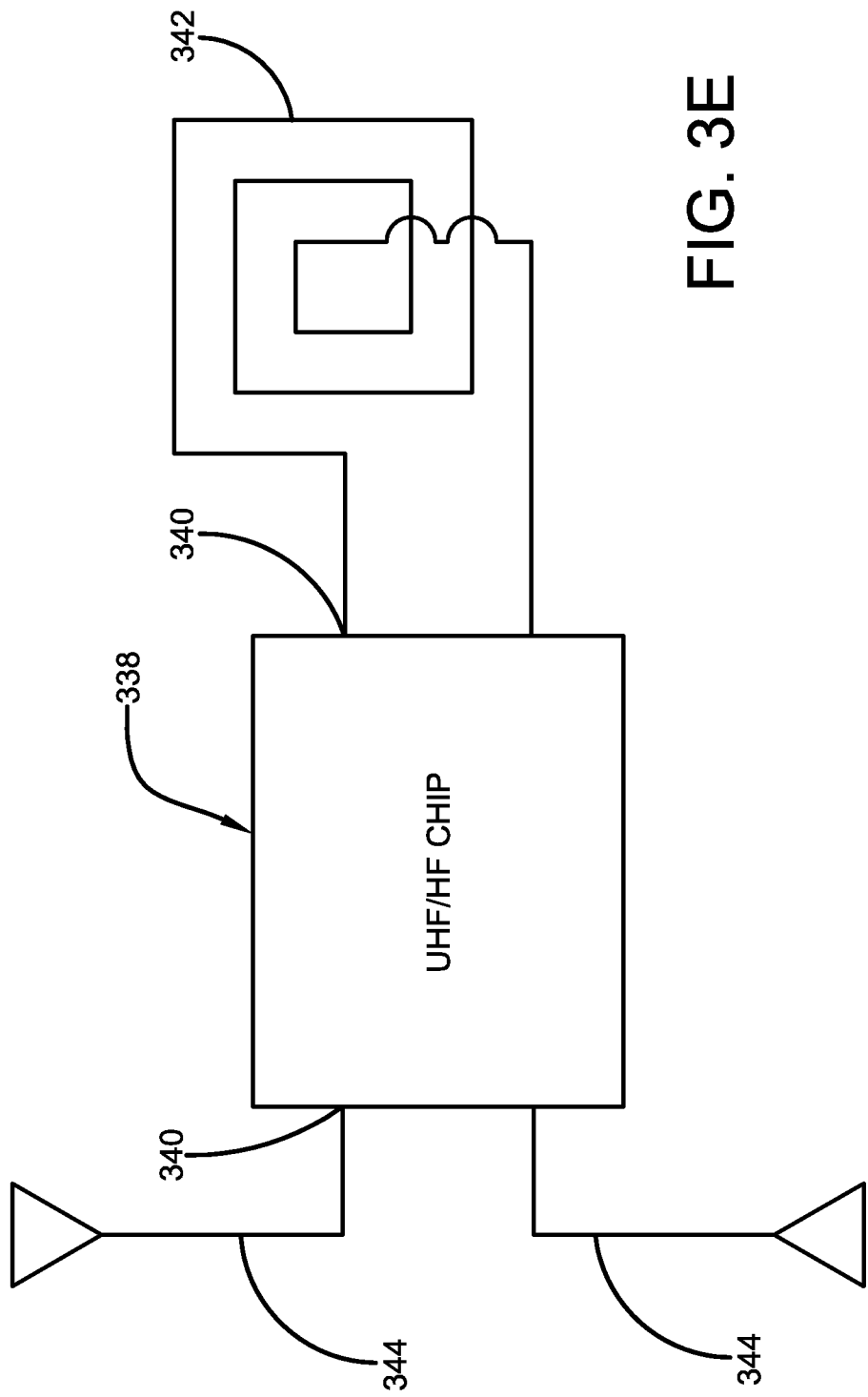
FIG. 3E illustrates a top perspective view of a single mode tag comprising separate interface for HF and UHF antenna in accordance with the disclosed architecture.

FIG. 3D discloses a single mode RFID chip 332 with a common interface 334 for connection of either a combined UHF/HF antenna 336 or a separate UHF antenna and a separate HF antenna, and FIG. 3E discloses a single mode RFID chip 338 with separate interfaces 340 for HF 342 and UHF 344 antennas or HF and UHF portions of a common antenna.

Figure 4:
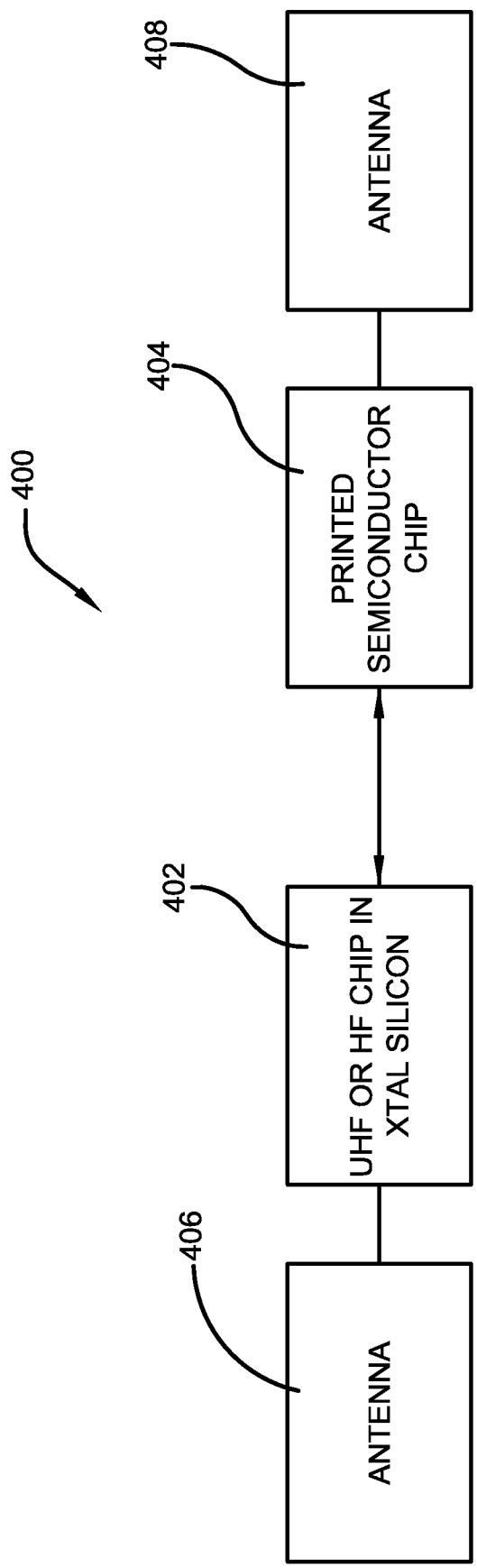
FIG. 4 illustrates a top perspective view of a dual mode tag combining a printed semiconductor chip with a crystal silicon UHF or HF chip in accordance with the disclosed architecture.

Further, the two chips can be formed either by the same technology such as fabricated on silicon wafers cut from a crystal, or one chip can be crystal silicon and the other an alternate semiconductor material. The alternate semiconductor material can be, for example and without limitation, amorphous silicon or an organic material such as polyaniline. Further, both chips could also be formed from the alternative material as well. As shown in FIG. 4, the dual mode RFID tag 400 can comprise a UHF or HF chip 402 of crystal silicon interfacing with a UHF or HF printed semiconductor chip 404. The HF chip further comprises an HF coil antenna 406 and the UHF chip comprises a UHF antenna 408.

Figure 5:
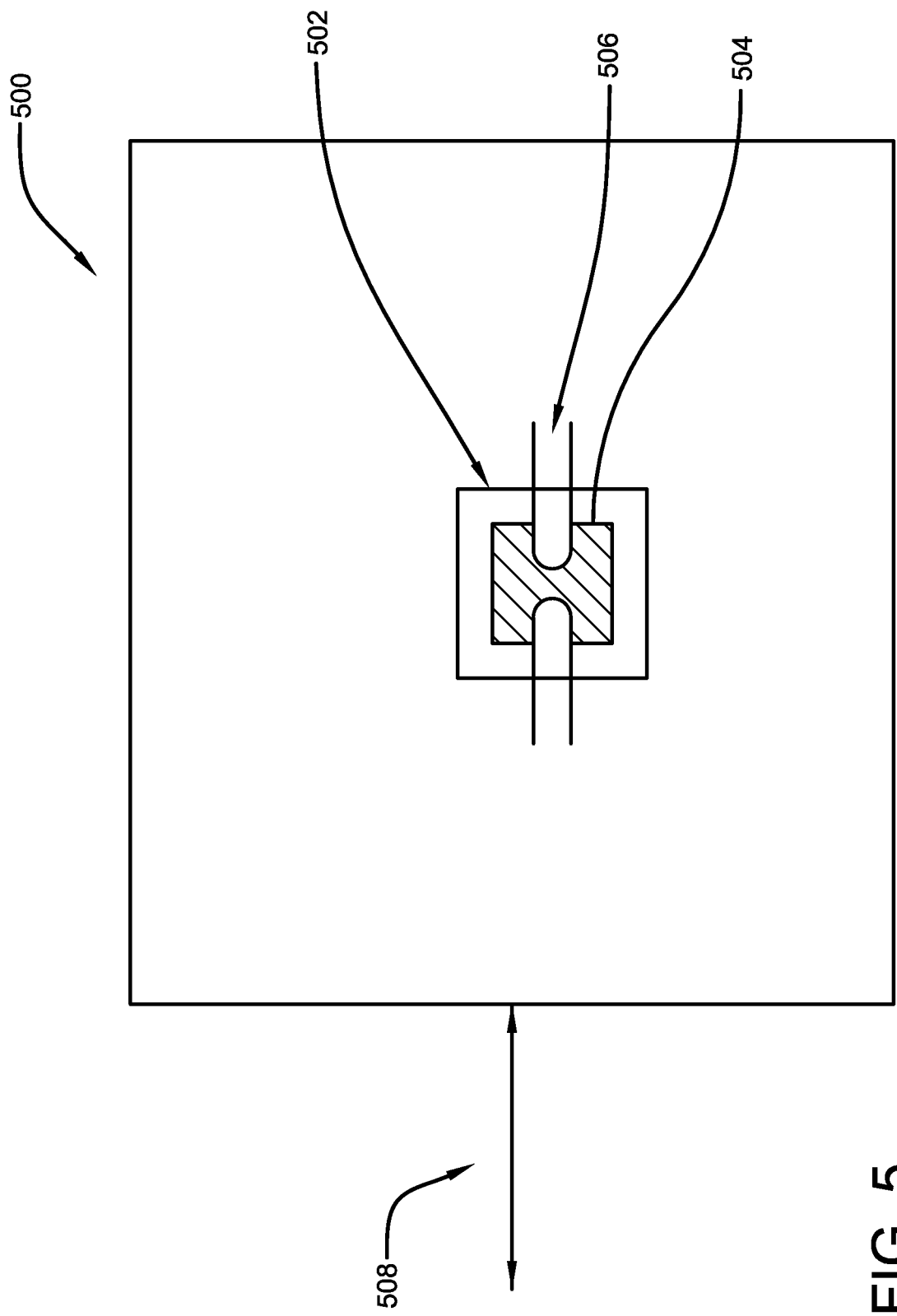
FIG. 5 illustrates a top perspective view of a dual mode chip comprising a printed semiconductor chip with a connection point for a crystal silicon chip in accordance with the disclosed architecture.

Additionally, as shown in FIG. 5, the dual mode RFID tag 500 comprises a printed semiconductor chip 502. The printed semiconductor chip 502, as part of its manufacturing process, creates a connection point for a conventional crystal silicon chip 504. Typically, the printed semiconductor chip 504 comprises chip bond pads 506 or other suitable connection points as is known in the art created by the printing process for connection by the crystal semiconductor chip 504. Further, the printed semiconductor chip 502 also comprises one or more connections 508 to an antenna which are either printed or formed by other suitable processes as is known in the art.

In another embodiment, dual mode technology is used to enhance communications, for example, NFC type RFID tags are generally designed to have a short operating range; the magnetic coupling used to read HF tags obeys a third power law with distance, so the field delivered drops rapidly. However, although the power received may be insufficient to operate the HF tag portion or too low to allow it to communicate back; the recovered energy is enough to enhance the sensitivity of the UHF tag portion.

Figure 6:
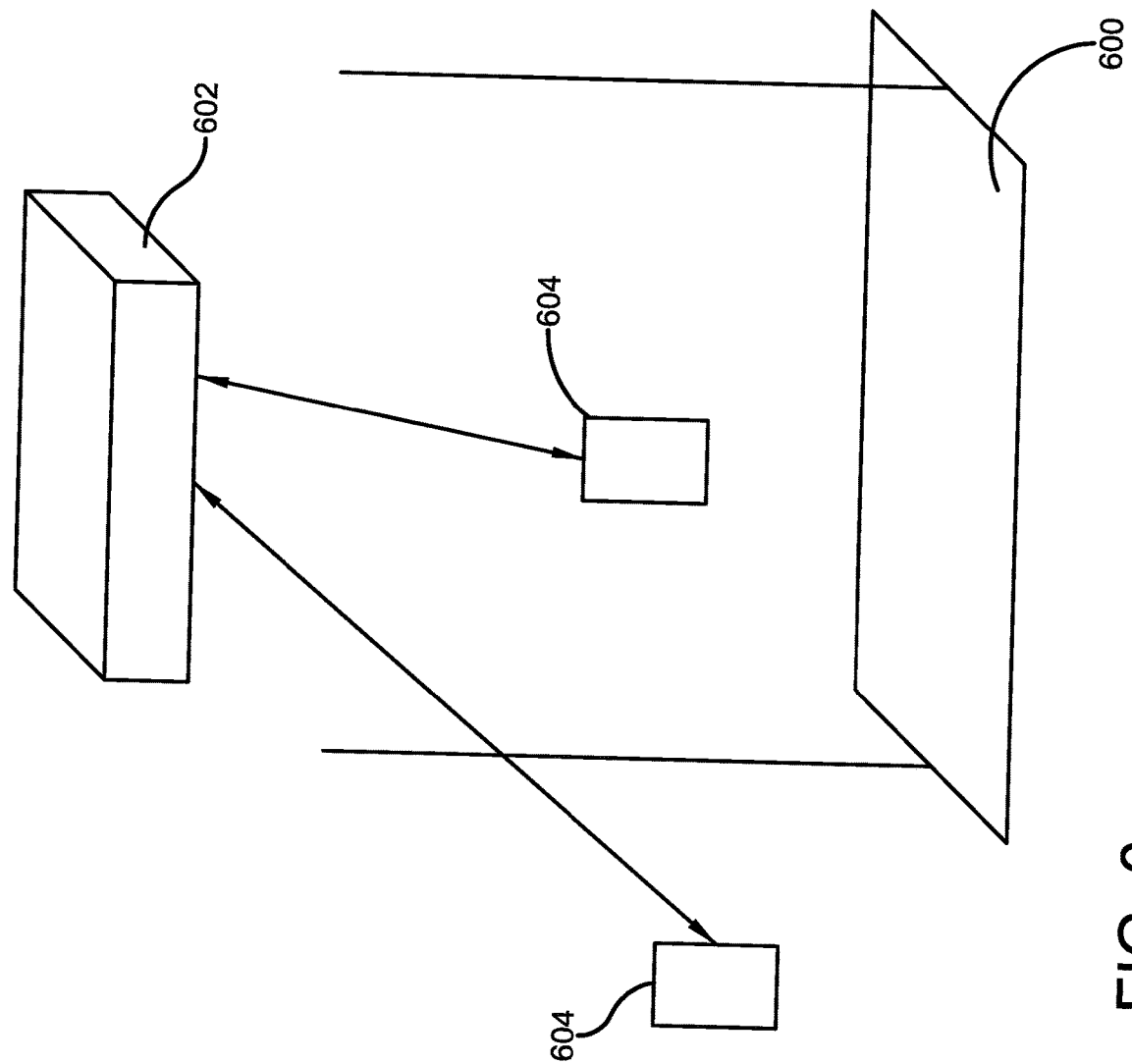
FIG. 6 illustrates a top perspective view of a dual mode chip comprising an HF field emitter and UHF reader in accordance with the disclosed architecture.

As shown in FIG. 6, a store exit may have both a HF field emitter 600 and a UHF reader 602. Typically, the HF field emitter 600 is a generator mat providing energy and localization and the UHF reader 602 is a ceiling mounted UHF reader system, though other types of emitters and readers can also be employed. The presence of the HF field may provide energy to increase the range of the UHF tag 604, or just set a flag in its shared memory to indicate that the HF field is present. The setting of the flag indicates that the tag 604 is both in range of the UHF reader 602, but in a region above a given field strength of HF energy which, as stated above, is very localized. Thus, only items detected by the UHF reader 602 with the HF presence flag set are detected at the exit to the store. In this manner, products that are shelved near the exit door area, or simply being moved across the door area, are discriminated against, which results in fewer false alarms.

In a further embodiment, the HF receiving coil in the structure has two resonances, one to allow NFC communication and the other to respond to a field at a lower frequency in the region of 8.2 MHz (or any other suitable frequencies for communicating with an EAS system) for compatibility with some forms of existing EAS systems.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) tag comprising:
   a near-field communications (NFC) booster comprising an NFC function and ultra-high frequency (UHF) tag communications system;
   a UHF core component;
   a high frequency (HF) core component; and
   a shared memory block component, wherein the NFC function interacts with the UHF communications system via the shared memory block component,
   wherein the radio-frequency identification (RFID) tag is adapted to communicate with a mobile device to selectively respond to the near-field communications (NFC) based on a unique cipher data, when influenced under high frequency (HF) and ultra-high frequency (UHF).

2. The RFID tag of claim 1, wherein the RFID tag is a dual mode tag selectively operable at high frequency (HF) and ultra-high frequency (UHF) based on detection from the mobile device through the unique cipher data including user identification, when the mobile device is triggered in a proximity of the RFID tag.

3. The RFID tag of claim 2, wherein the dual mode RFID tag comprises a UHF or HF chip of crystal silicon interfacing with a UHF or HF printed semiconductor chip.

4. The RFID tag of claim 1, wherein the RFID tag comprises UHF and/or HF tag functions located in a single chip.

5. The RFID tag of claim 1 further comprising a single communication interface coupled to a first co-located antenna and a second co-located antenna.

6. The RFID tag of claim 5, wherein the first co-located antenna is operating at HF and the second co-located antenna is operating at UHF.

7. The RFID tag of claim 1, wherein the RFID tag is in communication with, and is capable of being at least partially powered by, an NFC device.

8. The RFID tag of claim 1, wherein the RFID tag is a single mode tag.

9. The RFID tag of claim 8, wherein the single mode tag comprises a single communication interface coupled to a first co-located antenna and a second co-located antenna.

10. The RFID tag of claim 9, wherein the first co-located antenna is operating at HF and the second co-located antenna is operating at UHF.

11. The RFID tag of claim 9, wherein the single mode tag is in communication with, and is capable of being at least partially powered by, an NFC device.

12. The RFID tag of claim 1 further comprising two RFID chips with a communication interface between the two RFID chips.

13. A method of interacting a plurality of radio-frequency identification (RFID) devices, the method comprising:
   attaching an RFID tag to articles, the RFID tag comprising an HF core component, a UHF core component and a shared memory block component;
   utilizing a near-field communications (NFC) booster to engage in a communication with an NFC device of a mobile device;
   encrypting selectively the near field communications to detect high frequency (HF) and ultra-high frequency (UHF); and
   communicating with a UHF reader and an HF reader from the mobile device to decrypt the unique cipher data to establish communication between the RFID device and the mobile device.

14. The method of claim 13, wherein the shared memory block is accessible by the core component and the second core component.

15. The method of claim 13, wherein the RFID device either sets a flag to indicate an HF field is present or utilizes energy to increase range of the RFID device when receiving NFC communications.

16. A system for tracking articles, the system comprising:
   a mobile device equipped with near-field communications (NFC) and adapted to read high frequency (HF) and ultra-high frequency (UHF),
   a radio-frequency identification (RFID) tag operable to communicate with the mobile device to selectively respond to the near-field communications (NFC) based on a unique cipher data, when influenced under high frequency (HF) and ultra-high frequency (UHF), the radio-frequency identification (RFID) tag comprising:
   a near-field communications (NFC) booster which utilizes a NFC function and ultra-high frequency (UHF) tag communications system;

a UHF core component having two resonances;
a high frequency (HF) core component; and
wherein one of the two resonances influenced under high frequency (HF) or ultra-high frequency (UHF) to decrypt the unique cipher data and thereby allows NFC communications for communicating with an electronic article surveillance (EAS) system.

* * * * *